United States Patent [19]

Janssen

[11] 4,332,996

[45] Jun. 1, 1982

[54] APPARATUS FOR RESURFACING TRACK LINKS FOR CRAWLER-TYPE TRACTORS

[75] Inventor: Harvey W. Janssen, Lafayette, Calif.

[73] Assignee: Wolff Manufacturing Co., Burlingame, Calif.

[21] Appl. No.: 36,657

[22] Filed: May 7, 1979

[51] Int. Cl.³ .............................................. B23K 9/04
[52] U.S. Cl. ............................. 219/76.14; 219/125.12
[58] Field of Search ................ 219/73.11, 76.1, 76.14, 219/130.51, 125.1, 125.11, 125.12, 124.34, 137.41

[56] References Cited

U.S. PATENT DOCUMENTS

| 2,803,739 | 8/1957 | Bentzen | 219/125.1 |
| 2,813,190 | 11/1957 | Felmley, Jr. | 219/76.14 |
| 2,841,687 | 7/1958 | Richter. | |
| 2,938,997 | 5/1960 | Anderson. | |
| 3,019,328 | 1/1962 | Brashear, Jr. et al. | |
| 3,024,349 | 3/1962 | Hinrichsen et al. | |
| 3,109,921 | 11/1963 | Anderson | 219/125.11 |
| 3,114,032 | 12/1963 | Leader et al. | 219/125.1 |
| 3,821,840 | 7/1974 | Kershaw | 219/76.14 |
| 3,956,610 | 5/1976 | Kanbe et al. | 219/130.51 |
| 4,056,705 | 11/1977 | Linam et al. | 219/125.1 |

OTHER PUBLICATIONS

K. G. Kollman, "Solving the Problem of GMAW Fume Extraction", *Welding Journal*, 8/1973, pp. 503–508.

*Primary Examiner*—C. C. Shaw
*Attorney, Agent, or Firm*—Flehr, Hohbach, Test

[57] ABSTRACT

Method and apparatus for resurfacing track links in crawler-type tractors. The apparatus includes a platform for supporting a track link and a car mounted on the platform which is maneuverable with respect to the platform. The apparatus further includes a welder mounted on the car for resurfacing an assembled track link.

7 Claims, 10 Drawing Figures

FIG_2

FIG_7

FIG_6

FIG_8

FIG_9A

FIG_9B

APPARATUS FOR RESURFACING TRACK LINKS FOR CRAWLER-TYPE TRACTORS

This invention generally relates to equipment for rebuilding the tracks used on crawler-type tractors and, in particular, to equipment for resurfacing the track links on such tractors. A crawler-type tractor is a self propelled vehicle that runs on two endless self laid tracks. The tracks are each made of hinged track links.

Figure 8:
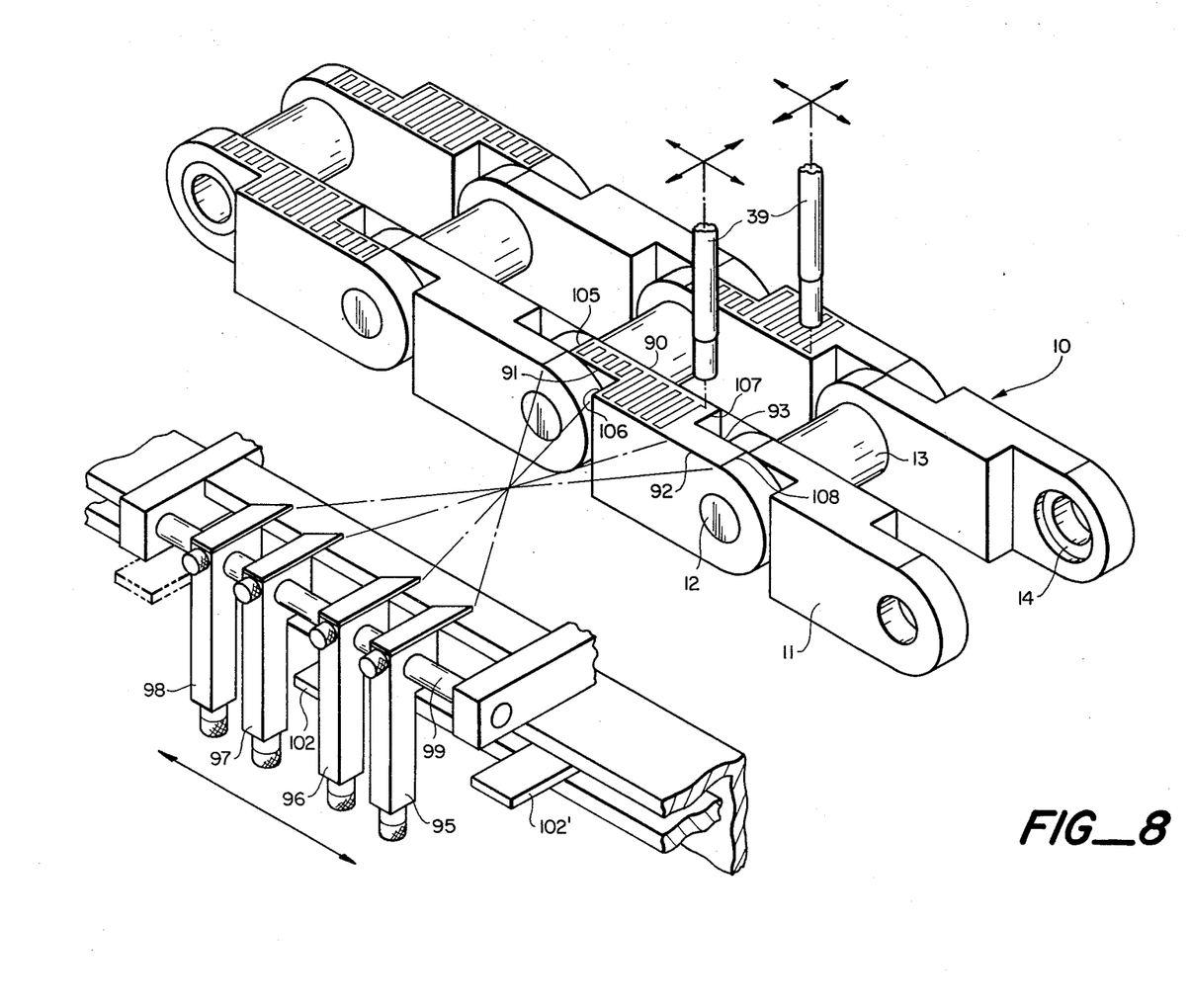
FIG. 8 is a diagrammatic view in perspective illustrating a section of track and the infrared detectors associated with the apparatus of FIG. 1.

For the past forty years these tractors have been manufactured with standard sealed tracks. FIG. 8 illustrates a portion of a track 10 which is comprised of a plurality of track links. Each link is joined by a pin 12 that is received in a bushing 13. In a standard sealed track the bushings rotate about the pin and are not lubricated.

Standard sealed tracks are resurfaced by welding a plurality of longitudinal stringer beads on the top surface of each track link. It is customary to first place beads of relatively soft material on the link or preheat the link to approximately 400°–450° F. Then, beads of a harder alloy are placed on the links. Stringer beads are aligned parallel to the longitudinal axis of the track and typically several stringer beads are placed in contiguous relationship on the surface of each track link.

One problem with standard sealed tracks is that these tracks develop wear between the pins and bushings. In answer to this problem sealed and lubricated tracks were developed in the early 1970's. On a sealed and lubricated track the areas between the pins and bushings are lubricated. The annular space is filled with oil, a small valve is incorporated and neoprene seals are used. Reference numeral 14 illustrates the location of the neoprene seals in FIG. 8.

A further advantage of a sealed and lubricated track is that it is not subject to pitch extension. Pitch extension occurs from the wear between the pins and bushings. This wear causes the pitch from bushing to bushing to extend. This extension in turn causes an abrasive action between adjoining links and wears away the faces of the links. After a period of time the links become narrower and eventually wear down to a point where they can no longer be rebuilt. Since sealed and lubricated tracks do not have this problem, the links fundamentally are a much more rebuildable structure.

The principal disadvantage of sealed and lubricated track is that the neoprene seals are subject to damage from heat during the process of resurfacing. The resurfacing procedure described above for sealed tracks can not be used because of the excessive heat produced during the pre-heating and welding steps. Up to now sealed and lubricated track links have been resurfaced by disassembling the track links; removing the seals and oil between the pins and bushings; reassembling the links, pins and bushings in a dry configuration; resurfacing the dry track links; disassembling the track links again; replacing the neoprene seals and oil; and reassembling the track links. The whole cycle of disassembly, resurface and reassembly takes many man hours. For instance, a D-8 track typically requires between forty to fifty man hours to resurface the links.

The long down time heretofore necessary for sealed and lubricated track resurfacing has caused several adverse situations in the industry. First, the sales of sealed and lubricated tracks have been lower than expected. Perspective purchasers of new tracks and tractors have not wanted to be faced with their equipment out of service for long periods of time. The old standard sealed tracks have thus appeared to be more cost effective. Secondly, when a sealed and lubricated track is resurfaced, it has heretofore been such a costly and time consuming procedure that all of the bushings and seals normally are replaced even though they may still be capable of several thousand more hours of use. Since the track links must be disassembled anyway for resurfacing, it has been more cost effective to replace the partially worn parts than to wait until replacement is actually needed.

There has been a long felt need in the industry to develop equipment that can resurface sealed and lubricated tracks economically. These tracks have the potential of being resurfaced twice or even three times before they must be replaced. These tracks are also a much more rebuildable structure than the old standard sealed tracks. In spite of all their advantages, however, sealed and lubricated tracks have heretofore not found wide acceptance.

The principal object of the present invention is to resurface sealed and lubricated tracks economically. Heretofore resurfacing such tracks required a long repair cycle and the replacement of partially worn parts. The present invention is expected to resurface two of these tracks in about eight to fifteen man hours. The present invention is able to achieve this object because the apparatus utilizes four welding heads and requires minimal set up and clean up time. A shielded gas arc is used instead of a submerged arc so there is no messy clean up required.

An additional object of the present invention is to resurface sealed and lubricated track links without disassembly and with the seals and lubrication in place. This object is achieved by welding the tracks partially submerged in a heat conductive fluid and welding alternating links in the track.

A further object of the present invention is to achieve a hard surface weld on track links without preheating them. This object is achieved by laying a lateral pattern of oscillator beads on each link. This technique puts more heat into each link and thus avoids under-bead cracking and hydrogen embrittlement.

Also an object of the present invention is to increase the sales of sealed and lubricated tracks.

An additional object of the present invention is to obtain a higher production output. To rebuild a track link with stringer beads, the welding head must be stopped eight to ten times per link for each layer of rebuild. In contrast, the present invention uses oscillator beads and there is only one stop required per layer. In other words, the ability to weld oscillator beads permits this machine to actually be welding more of the time.

A further object of the present invention is to weld track links without an excessive consumption of flux and in close proximity to water. The present invention eliminates the use of grannular flux which is hydroscopic. The apparatus described herein uses an open arc process with an alloy flux cored wire and an inert gas shield.

Another object of the present invention is to eliminate the hazard of picking up foreign materials and bits of alloy in the weld. This pickup can occur when using a submerged arc and is both harmful to the weld and forms a weld with higher hardness than intended. This object is achieved by using an inert shielding gas.

Still another object of the present invention is to produce a flat, uniform weld that completely covers the horizontal surface of each track link. This object is attained by the various sequencers, timers, sensors and controllers that are described herein.

The foregoing and other objects are achieved by a method and apparatus for resurfacing track links for crawler-type tractors. The apparatus includes a platform for supporting a track link and a car mounted on the platform which is maneuverable with respect to the platform. The apparatus further includes a welder mounted on the car for resurfacing an assembled track link.

Additional objects and features will appear in the following description in which the preferred embodiment has been set forth in detail in conjunction with the accompanying drawings.

Figure 1:
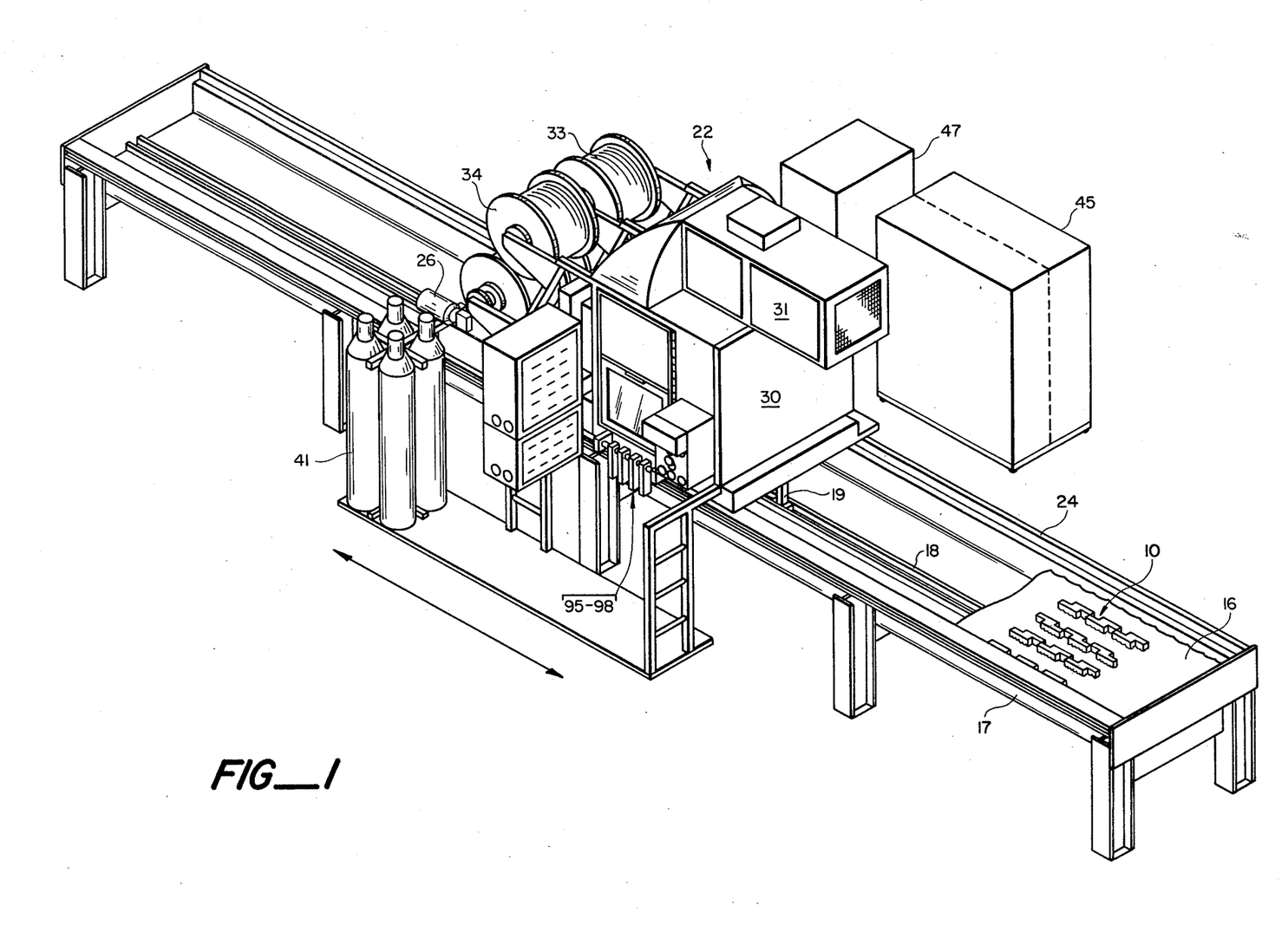
FIG. 1 is a perspective view of a track link resurfacing apparatus according to the present invention.
Figure 2:
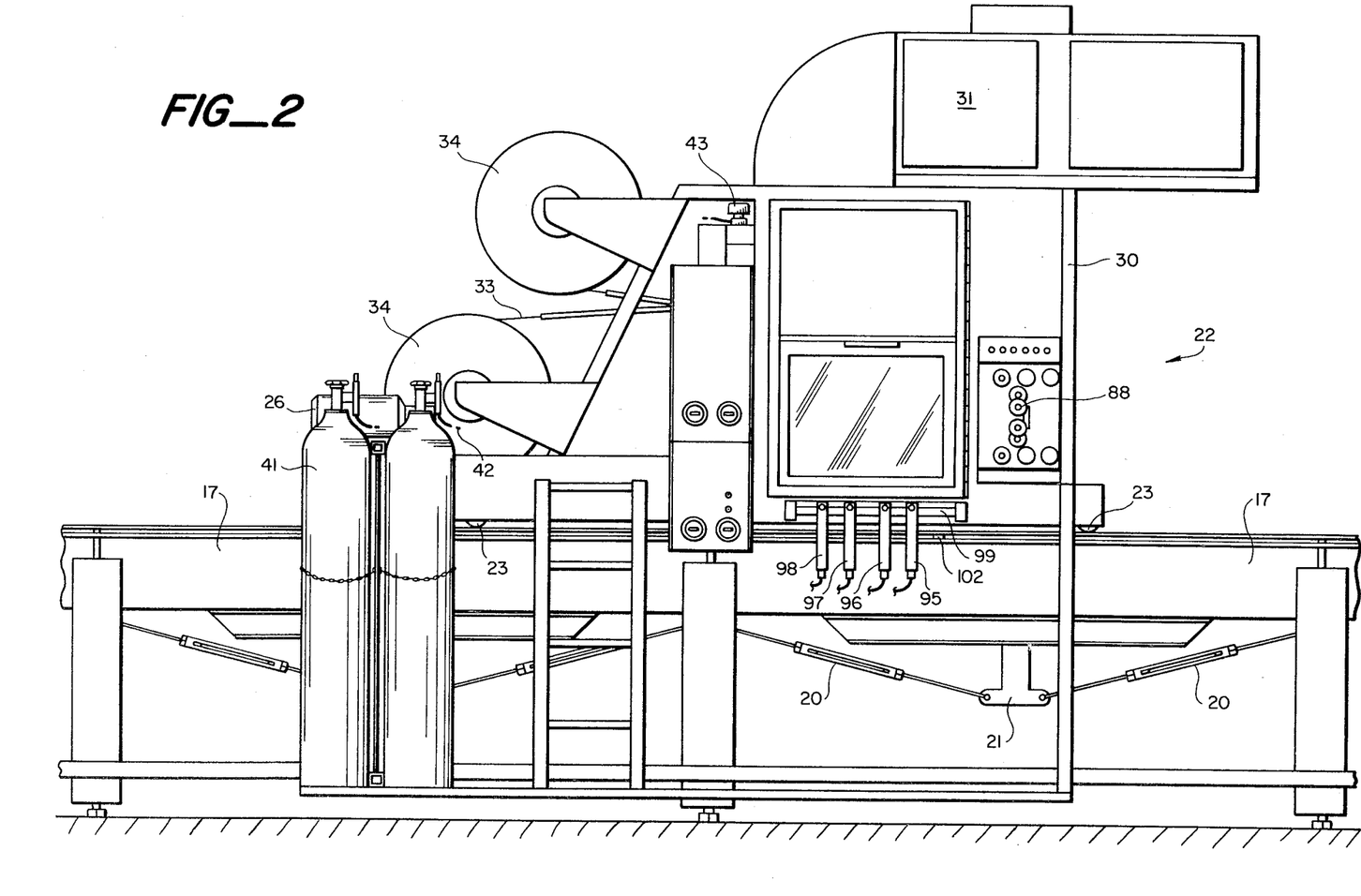
FIG. 2 is a side elevational view, broken away of the track link resurfacing apparatus of FIG. 1.
Figure 3:
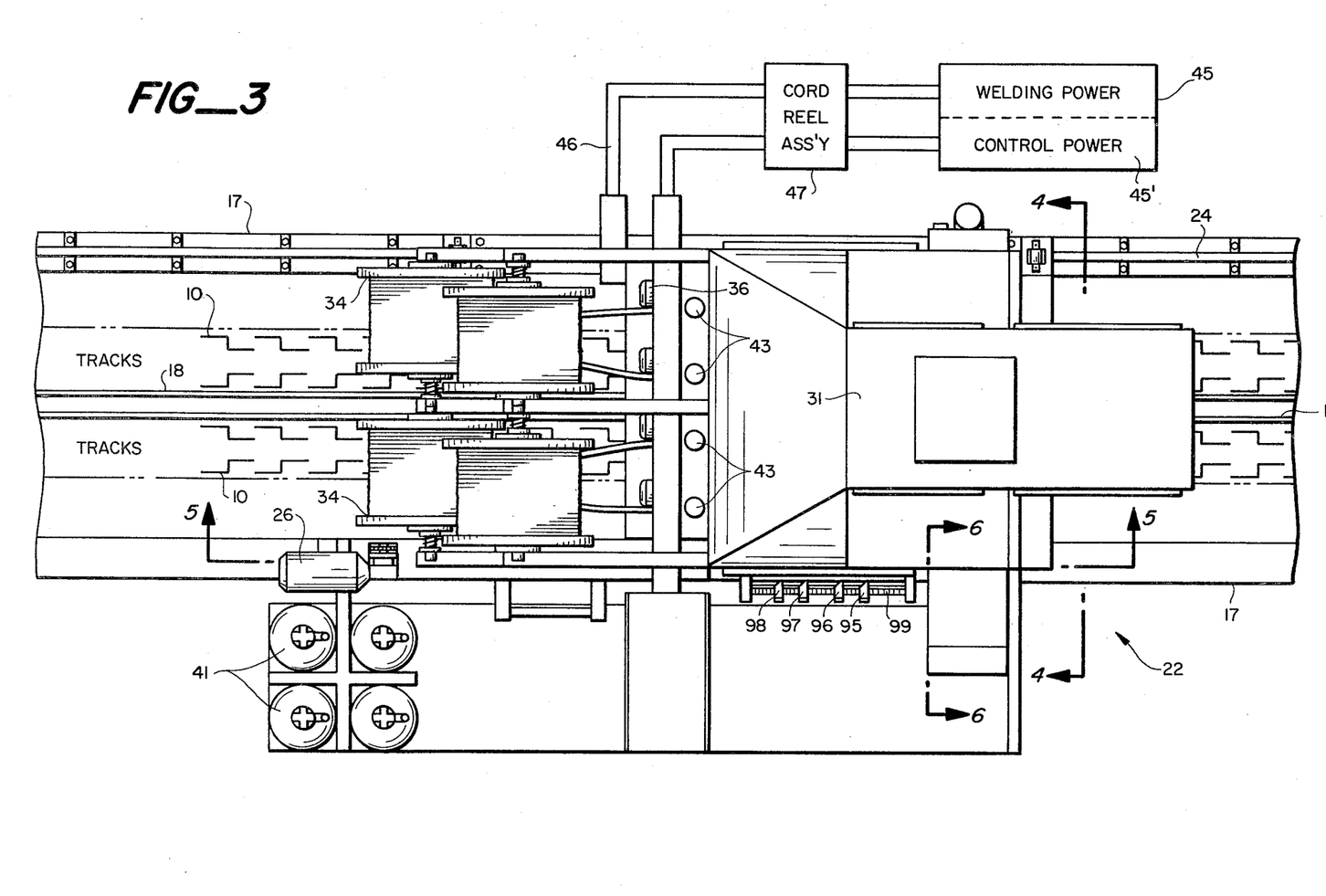
FIG. 3 is a top plan view, broken away, of the track link resurfacing apparatus of FIG. 1.

Referring to FIGS. 1-3, the apparatus includes an elongate tank 17 for containing a heat conductive fluid into which is positioned two tracks 10. In the preferred embodiment water is used. The tank is supported by a platform and holds sufficient fluid 16 to partially immerse the tracks up to a distance of approximately $\frac{1}{8}$ inch below the upper horizontal surface of each track link. At this depth both the pins and bushings are completely submerged. The tank is dimensioned to accomodate track links of any presently manufactured size. The platform and the tank 17 are leveled in the horizontal plane using a plurality of turnbuckles 20. These turnbuckles engage the legs of the platform and the brackets 21. The tracks are aligned against an elongate guide channel 18 which runs along the bottom of the tank. The guide channel is used to align the tracks and is engaged by a guidance bar 19 which positions the welding heads as described in detail below.

Referring to FIGS. 1-3, the welding apparatus and control circuits are all mounted on a car 22 which moves back and forth with respect to the tank 17 and the tracks therein. The car is a skeletal frame onto which all of the machinery is mounted. The car is supported above the side walls of the tank by a plurality of wheels 23. On one side wall of the tank is mounted a crane rail 24, FIG. 4. The car includes several guide wheels which engage the crane rail and guide the car in its travel up and down the tank. The car is driven by a travel motor 26 which is a DC variable speed motor that can propel the car either backwards of forwards along the water tank. The travel motor is connected by a chain 27 to two rubber tire drive wheels 28. These drive wheels engage the top of the side wall of the tank opposite the crane rail. The travel motor propels the car in either a skip mode, a narrow weld mode, or in a wide weld mode with the speed controlers 110, 111, 112 described below.

The welding process generally occurs in the central portion 30 of the car 22, FIG. 2. The welding process is enclosed by a series of vents and dampers that allow air to enter the car and yet not disturb the gas shielding around the arc. The welding process generates a substantial amount of smoke and this smoke is removed by an electrostatic precipitator 31 mounted on top of the car. The precipitator includes a blower which draws all of the smoke and fumes from the welding process into the precipitator.

Figure 5:
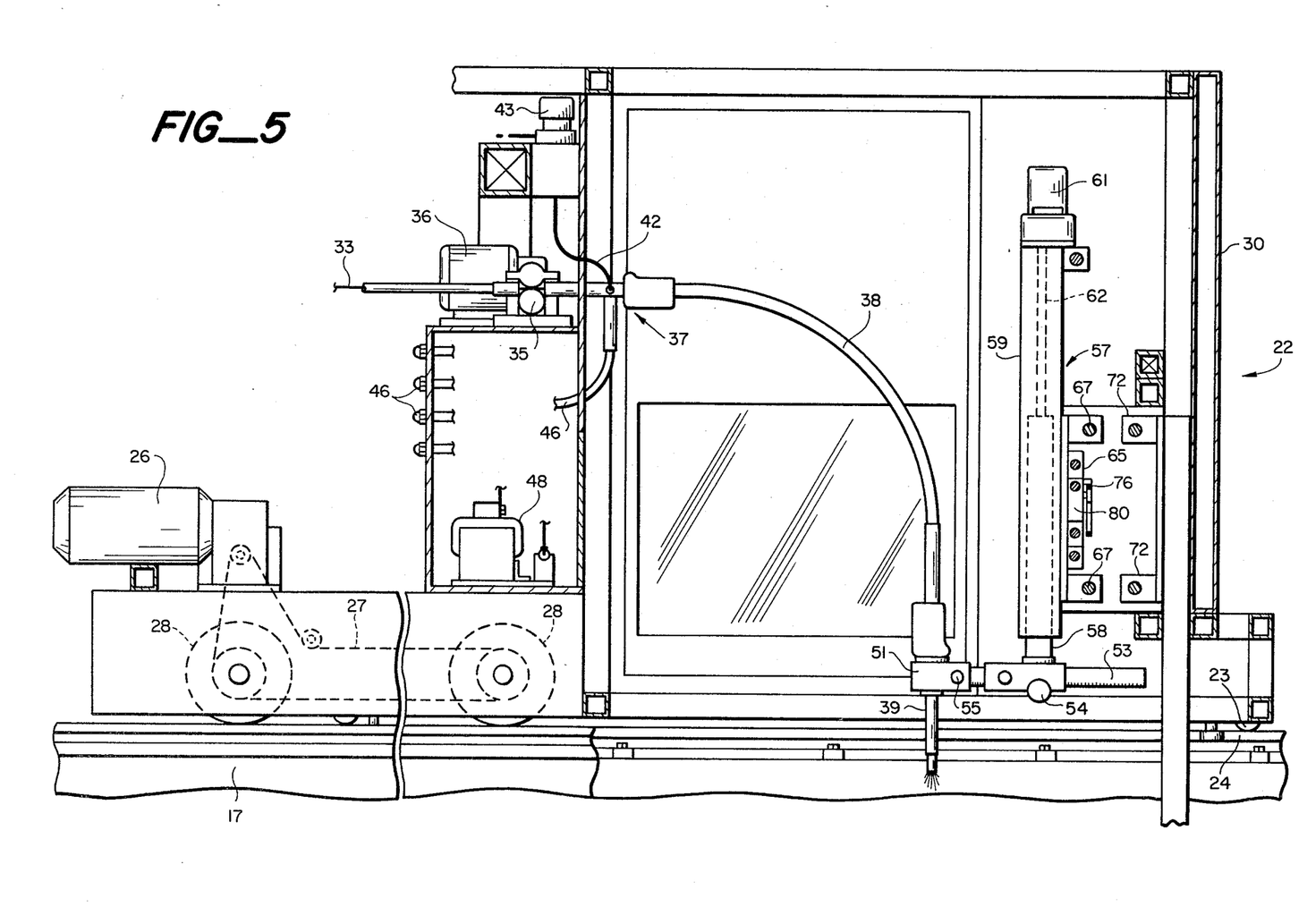
FIG. 5 is a side elevational view, broken away and in section taken along line 5—5 of FIG. 3.

Referring to FIGS. 2, 3, 5 the open shielded arc welding process utilizes a flux and alloy core wire 33 that is 5/64 inches in diameter. The wire is supplied from one of four reel type wooden spools 34. Each spool holds 250 lbs. of welding wire. In the preferred embodiment No. 8129 wire available from the Stoody Company, City of Industry, California is used. The spools are each mounted on a shaft that attaches to the car 22. There is a drag brake incorporated into the shaft which provides a drag on the spool as the wire is being unwound. This drag brake ensures that the spools will automatically stop if the wire ever stops. The wire feeder is driven by a variable speed DC motor 36. The speed of the motor is regulated by one of three speed controllers 115, 116, 117 to operate in an inch mode, a wide mode and a narrow mode. The wire feeders 35, FIG. 5 direct the wire 33 through a connector assembly 37 and into a hollow cable or conduit 38. The hollow cable directs the wire down to one of the four welding heads 39. The arrangement of the spools mounted on a horizontal shaft and the horizontal wire feed allows the wire to be fed to the welding heads without twisting. In addition, this arrangement permits more control over the wire and eliminates wire wander.

The inert gas which is used to provide the shield in the open arc welding process is stored in a plurality of tanks 41, FIG. 2 located in a rack along the side of the car 22. The tanks contain argon/carbon dioxide gas. The gas is directed into the welding enclosure by a plurality of hoses 42, FIG. 5 and the flow is controlled so that gas is flowing only when the process of welding is occurring.

The welding current is supplied by a power supply 45, FIG. 3. A constant potential-type power supply is used, and the speed at which the wire is fed into the connector assembly 37 determines the welding current. The power supply also furnishes control power 45', FIG. 3 to the circuit elements illustrated in FIGS. 9A and 9B. This power supply is a commercially available unit that supplies between 250 and 500 amps DC and is connected to the apparatus by a plurality of power cables 46. The cables are kept untangled by a cord reel assembly 47. The power cables are connected to the connector assembly 37 so that the welding current is passed through the hollow cable along with the welding wire and the shielding gas. The welding current is passed to the wire in the welding head as the wire passes through the tip. The tip of the welding head also includes a nozzle which distributes the shielding gas around the welding area.

The arc is established without the welding wire 33 actually touching the track links. The apparatus includes a plurality of high frequency generators 48, FIG. 5 that superimpose a high frequency voltage on the wire and causes a spark to jump between the wire and the track links. When the arc is being established, the wire is inched by the wire feeders 35 in the inching mode at a rate of approximately 50 inches per minute. After the arc is established, the wire feeders drive the wire at speeds of approximately 300 to 400 inches per minute depending on whether the apparatus is in the narrow or the wide mode of operation.

Referring to FIG. 5, each welding head 39 is firmly attached to a mounting block 51. The mounting block and the welding head are horizontally adjustable along the longitudinal axis of the water tank. This longitudinal adjustment is effected by a rack 53 and a pinion gear 54 and permits the four welding heads to be aligned in registration with the track links. It should be appreciated that two sets of tracks are resurfaced simultaneously and these tracks are typically displaced longitudinally with respect to each other in the water tank. When the machine is being set up, the four welding heads are individually adjusted so that each welding bead is started precisely on the leading edge of each track link.

The mounting blocks 51, FIG. 5 are also capable of being rotated about the rack by loosening the rotation adjustment screws 55. This adjustment permits the welding heads to build up the sides of the track links with stringer beads so that the side wear of the track links can be resurfaced.

Figure 4:
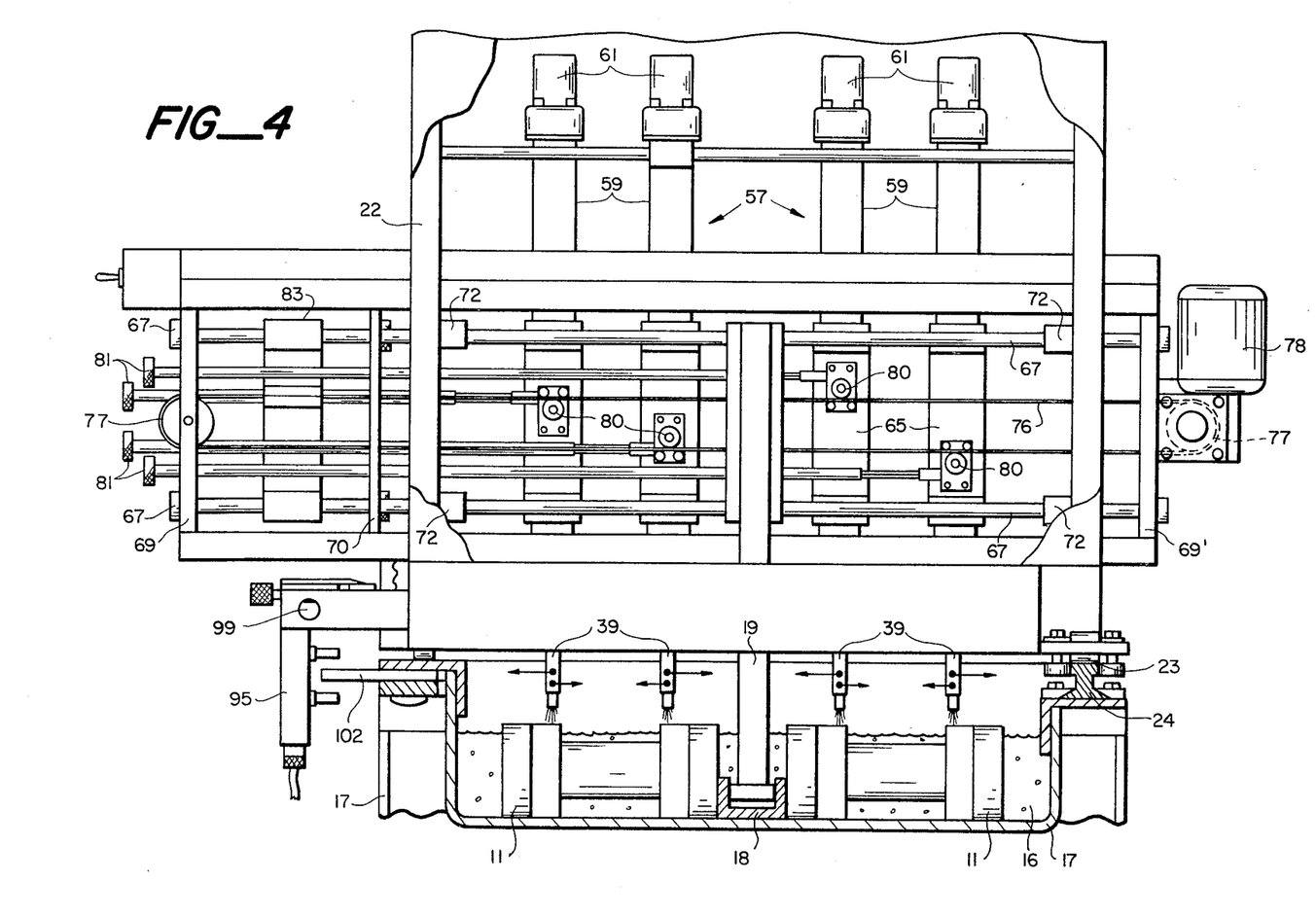
FIG. 4 is an end elevational view, broken away and in section taken along line 4—4 of FIG. 3.

Each welding head 39 FIGS. 4, 5 and mounting block 51 can be adjusted vertically to accommodate for the various sizes of tracks. This vertical adjustment is made by a square shaped telescoping tube assembly 57. The tube assembly includes an inner square tube 58 which is rigidly attached to the rack and pinion 53, 54. The inner tube contains a cross-drilled nut and is slideably received within the outer square tube 59. The inner square tube and the mounting blocks are raised and lowered by an elevation motor 61. The electric motor drives a lead screw 62 which engages the cross drilled nut within the inner tube 58. When the elevation motor rotates, the lead screw and nut cause the inner tube 58 to raise and lower with respect to the outer tube. Relative rotation of the tubes is prevented by their square shape and the annular space between the inner and outer tubes contains Teflon strips which provide a bearing surface between the two telescoping tubes. The Teflon strips (not shown) also eliminate the play and slop within the telescoping tube assembly so that each welding head can be precisely aligned and precise edges of the bead can be obtained. The telescoping tube assembly also isolates the welding heads from vibrations and provides better control of the wire with respect to the track links.

Referring to FIGS. 4 and 5, each welding head 39 and telescoping tube assembly 57 is rigidly mounted to a ball bushing casting 65. Each ball bushing casting is laterally moveable with respect to the car 22 and is supported for horizontal motion in this direction by two horizontal support rods 67. The ball bushing castings are supported for relative motion with respect to the rods and are driven by the chain assembly described below. The horizontal support rods 67 are rigidly mounted on two vertical end plates 69, 69' and a vertical medial plate 70. The vertical plates 69, 70; the horizontal support rods 67; and the ball bushing castings 65 are all supported with respect to the car by a series of linear bushing blocks 72. The vertical plates and the support rods form an integral rigid structure termed the carriage. The carriage is laterally moveable in a horizontal plane with respect to the car by the motion of the guide bar 19 as described below. The linear bushing blocks 72 support the carriage and permit this relative motion.

The purpose of the carriage is to move the welding heads laterally back and forth in order to track the alignment of the guide channel and thus maintain the lateral alignment of the welding heads with respect to the tracks during the entire resurfacing operation. Typically, the tracks are approximately 50 feet in length and may be subjected to curvature in the horizontal plane. To maintain the alignment of the welding heads, the tracks are both positioned in the water tank 17 against the guide channel 18. This is illustrated in FIG. 4. The guide channel thus aligns the tracks. As the car 22 travels down the water tank, the guidance bar 19 rides in the guide channel 18. If there is a horizontal curve in the guide channel, the guidance bar 19 will track the curve and will move the welding heads appropriately. Motion of the guidance bar causes lateral horizontal motion of the horizontal support rods 67, FIG. 4 which in turn causes lateral motion of both the vertical plates 69, 70 and the ball bushing castings 65. The castings are each connected to one of the telescoping tube assemblies 57 and this causes the welding heads to move.

Referring to FIG. 4, the welding heads 39 are laterally moved back and forth in a cyclic manner with respect to the track links by a chain drive located within the carriage. Each ball bushing casting 65 slides back and forth along the horizontal support rods 67 and is moved laterally by a chain 76. The chain passes between two sprockets 77 mounted on the vertical end plates 69, 69'. The sprockets do not displace with respect to the carriage. The chain is driven back and forth by an oscillator drive motor 78. The drive motor is a variable speed DC motor and moves at two speeds depending on whether the apparatus is operating in the wide or the narrow mode. The speed of the motor is regulated by two speed controllers 113, 114. The chain drive moves the welding heads with respect to the carriage and the sprockets and chain are an integral part of the carriage.

The lateral position of each welding head is indexed to its track link by moving the ball bushing casting 65, FIG. 4 with respect to the chain 76. During normal operation the ball bushing casting 65 does not move relative to the chain. If lateral adjustment of a welding head is desired, the sprocket gear 80, FIG. 4 is rotated and the position of the ball bushing casting is adjusted with respect to the chain. The sprocket gear 80 is turned by a welding head adjusting knob 82. The knob is connected to a worm gear assembly by a telescoping rod having a square cross section which operates in the same manner as the telescoping tube assembly 57 described above. The worm gear assembly is located on the casting and it turns the sprocket gear 80.

The worm and sprocket gear assemblies 80 and the head adjusting knobs 81 which position the welding heads with respect to the chain permit the welding heads to be laterally indexed to the track links while the machine is in motion. Thus, lateral adjustments can be made without requiring the welding operation to stop.

Figure 6:
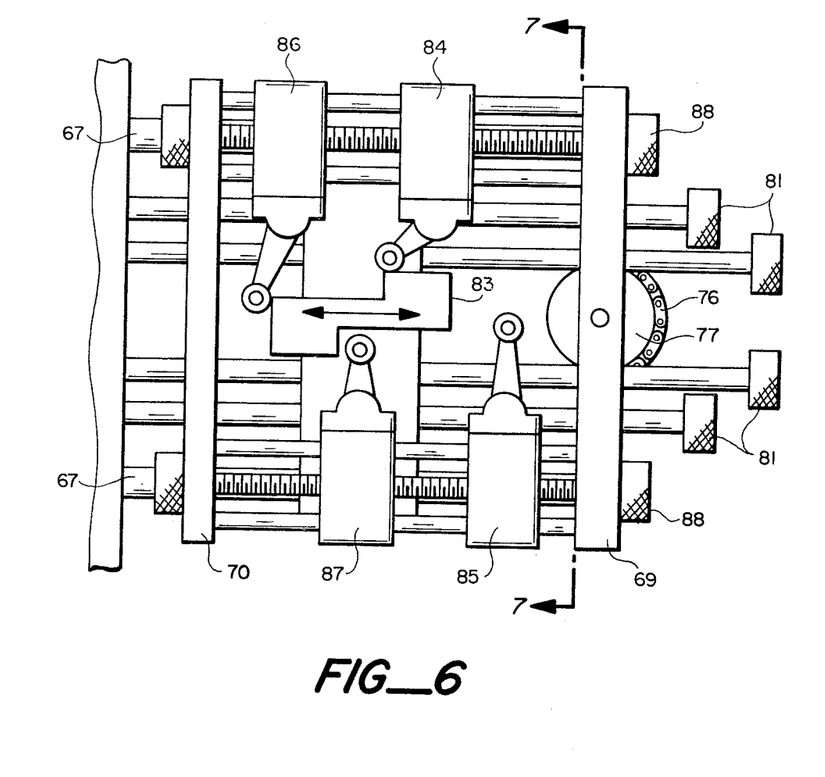
FIG. 6 is an end elevational view, broken away and in section taken along line 6—6 of FIG. 3.
Figure 7:
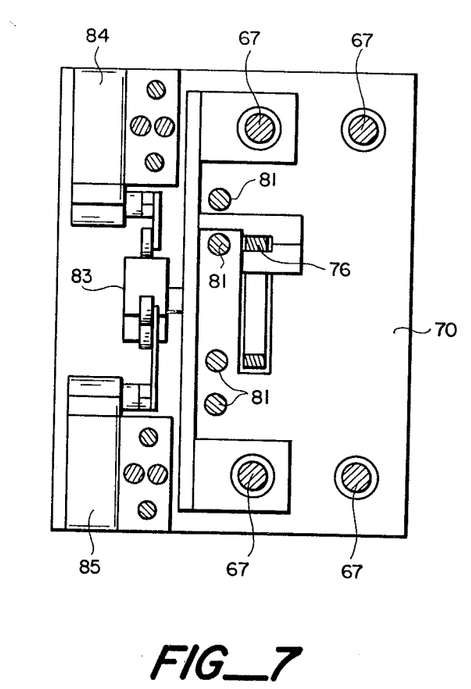
FIG. 7 is a side elevational view, broken away and in section taken along line 7—7 of FIG. 6.

Referring to FIGS. 6, 7 the length of the back and forth motion of the chain 76 is controlled by a Z-shaped cam 83. This cam is rigidly attached to the upper run of the chain and moves with it. The cam actuates the four limit switches 84–87 which in turn energize and deenergize the drive motor 78. The appropriate limit switches are selected by the infrared sensors 95–98 described below. The limit switches are mounted on shafts which pass through the two vertical plates 69, 70. The limit switches are laterally adjustable with respect to the cam and with respect to the vertical plates by the positioning knobs 88. The limit switches are adjusted laterally in order to vary the length of the lateral motion of the welding heads across the tracks links. This lateral motion is perpendicular to the longitudinal axis of the track. The relative position of the limit switches 84–87 determines the length of the oscillator bead on the surface of each track link. This length of the bead is measured laterally with respect to the longitudinal axis of the track. A substantial range of motion is required because the machine accomodates track links that may be from one inch up to three inches in width.

Referring to FIGS. 6 and 8, limit switch 86 stops the chain so that the welding head establishes the edge of the track link indicated by reference numeral 90. Limit switch 84 stops the chain and the drive motor 78 to establish the edge 91. Limit switch 85 establishes the edge 92 and limit switch 87 establishes the edge 93 of the track link.

The longitudinal length of the layer of resurfacing on each track link is determined by the four infrared sensors 95–98, FIGS. 2, 4, 8. Each sensor includes an infrared source and a detector. A signal is generated when the infrared beam is broken. These infrared sensors are mounted on the car 22 and move with it along the water tank. Infrared sensors are used in order to overcome the problems of ambient light, smoke and dust which accompany the welding process. The infrared sensors are actuated by a plurality of flags 102 which are positioned along the water tank at appropriate points corresponding to the location of the track links in the water tank. The flags are positioned one per track link to break the beam of each infrared sensor.

Referring to FIG. 8 the first sensor 95, IFR 1 triggers the control circuit into the first narrow mode and signals that the welding heads are passing over the leading edge 105 of the track link. The second infrared sensor 96, IFR 2, determines the leading edge 106 of the full width weld and triggers the control circuit into the wide mode. The third infrared sensor 97, IFR 3 determines the edge 107 of the end of the full width weld and triggers the control circuit into the second narrow mode. The fourth infrared sensor 98, IFR 4 signals the trailing edge of the weld 108. This fourth sensor terminates the welding and causes the car to travel on to the next link to be welded in the skip mode.

During the set up procedure the car is moved down the track and the welding heads are positioned at the leading edge of each track link 105, FIG. 8. A flag is mounted on the tank to actuate the first infrared sensor 95, IFR 1, FIG. 2 at this point. After the flags have all been positioned, the infrared sensors are positioned relative to each other by the rack and pinion 99. Since the shape of the surface of each track link is the same and the leading edge of each link is signaled by the flag 102, the other longitudinal edges of the track link are determined by positioning the infrared sensors with respect to each other.

During the set up procedure the flags 102, FIGS. 2, 8, are positioned opposite every link. However when the car travels down the tank, every other link is welded. This alternate welding procedure ensures that the track does not heat up to a temperature that could damage the neoprene seals and the lubrication in the track links. After the car has made a complete transit of the track and every alternate link has been resurfaced, the infrared sensors are repositioned to adjust between the leading and trailing edges of the flags. The car then travels back across the track and welds the remaining links.

It should be noted from FIGS. 6 and 8 that when the first infrared sensor 95 is actuated at the leading edge 105 of the track link, the control circuit commences receiving input data from limit switches 86, 84. These limit switches position the welding heads so that the first narrow portion of the track link is resurfaced and the apparatus operates in the narrow mode. When the flag 102 actuates the second infrared sensor 96, the control circuit is switched to receive inputs from limit switches 86 and 85. The welding heads then commence to resurface the full width of the track link between the edges 90, 92 and the apparatus operates in the wide mode. When the flag 102 actuates the third infrared sensor 97, the control circuit is switched to receive inputs from limit switches 87, and 85. The welding heads then commence to resurface the second narrow section of the track link between the edges 93 and 92 and the apparatus operates in the narrow mode. When the flag 102 actuates the fourth and last infrared sensor 98, the welding process is stopped because the trailing edge 108 of the track link has been reached. The car is then moved to the next alternate track link where its corresponding flag triggers the first infrared sensor 95 and the process is repeated.

OPERATION

The apparatus is initially set up by positioning two tracks 10 side by side in the water tank 17. The tracks are placed up against the guide channel 18 in order to ensure that alignment is maintained between the tracks and the welding heads 39.

Next, the welding heads are positioned relative to the track links 11. Referring to FIGS. 4, 5, the welding heads are first adjusted to the height of the track using the telescoping tube assembly 57, 58, 59 and the elevation motor 61. Next, each welding head 39 is moved longitudinally relative to each other in order to compensate for the relative longitudinal displacement between the leading edges 105 of the track links. This longitudinal adjustment is made with the rack 53 and the pinion 54 and ensures that the welding heads simultaneously contact the four leading edges 105 on each track link. Thereafter, the welding heads are positioned relative to the outside near edge 92 of the track links. This adjustment is made by using the head adjusting knobs 81 and the sprocket and worm gear 80 to move the ball bushing casting 65 with respect to the chain 76. Next, the four limit switches 84–87 are positioned relative to the Z-shaped cam 83, FIG. 6 using the knobs 88. By positioning these limit switches the lengths of the oscillator welds are determined. Referring to FIGS. 6, 8 limit switch 86 positions the edge 90; limit switch 84 positions edge 91; limit switch 85, edge 92; and limit switch 87, edge 93. Since these dimensions of the track links are all the same, the above set up procedure holds throughout the welding process.

The flags 102, FIG. 8 are then mounted on the side wall of the water tank 17 opposite each link. The car 22 is positioned opposite the first link so that the welding heads 39 are positioned directly over the leading edge 105 of the first track link. The flag 102 is then positioned to actuate the first infrared sensor 95 when the car reaches this point. The car is then moved to position the welding heads directly above the leading edge of the next alternate track link. When the car is in position, the second flag is mounted on the water tank. This procedure is repeated all the way down the water tank and a flag is placed opposite each link.

After the flags 102 are all in place, the infrared detectors 95-98, FIGS. 4, 8 are positioned with respect to each other. These infrared detectors move with the car and are positioned with respect to each other using the rack and pinion 99. The first infrared detector 95 is not moved because its position has been correlated to the flags 102. The second infrared detector 96 is positioned relative to the first so that the flag 102 actuates the second detector when the welding heads pass over the leading edge 106 of the wide portion of the track link. The third infrared detector 97 is positioned with respect to the first detector 95 so that when the welding heads pass over the trailing edge 107 of the track link, the flag 102 actuates the third detector. The fourth infrared detector 98 is positioned with respect to the first detector 95 so that when the welding heads pass over the trailing edge 108 of the track links, the flag 102 actuates the fourth detector.

After the above-described set up sequence has been completed, the apparatus is ready for operation. The welding heads follow the square tooth pattern illustrated in FIG. 8. The welding heads move laterally with respect to the track links when the oscillator drive motor 78 is actuated to move the chain 76. The welding heads move longitudinally with respect to the track links when the travel motor 26 is actuated to step the car forward. The speed of the welding heads across the track links is different in the wide and narrow modes and the rate of advancement of the car in these modes is also different. The speeds of the two motors 26, 78 are controlled in the narrow and wide modes by the speed controllers 110, 113 and 111, 114 respectively. The speed of the wire feeders 35 is changed in the wide and narrow modes by the controllers 116, 117. The speed of the wire controls the welding current and in turn the input of heat into the link. This insures that the welding heads set down a uniformly flat bead with precise edges on each track link and reduces the head input into the narrow portion of the link to protect against damaging the neoprene seal.

Figure 9A:
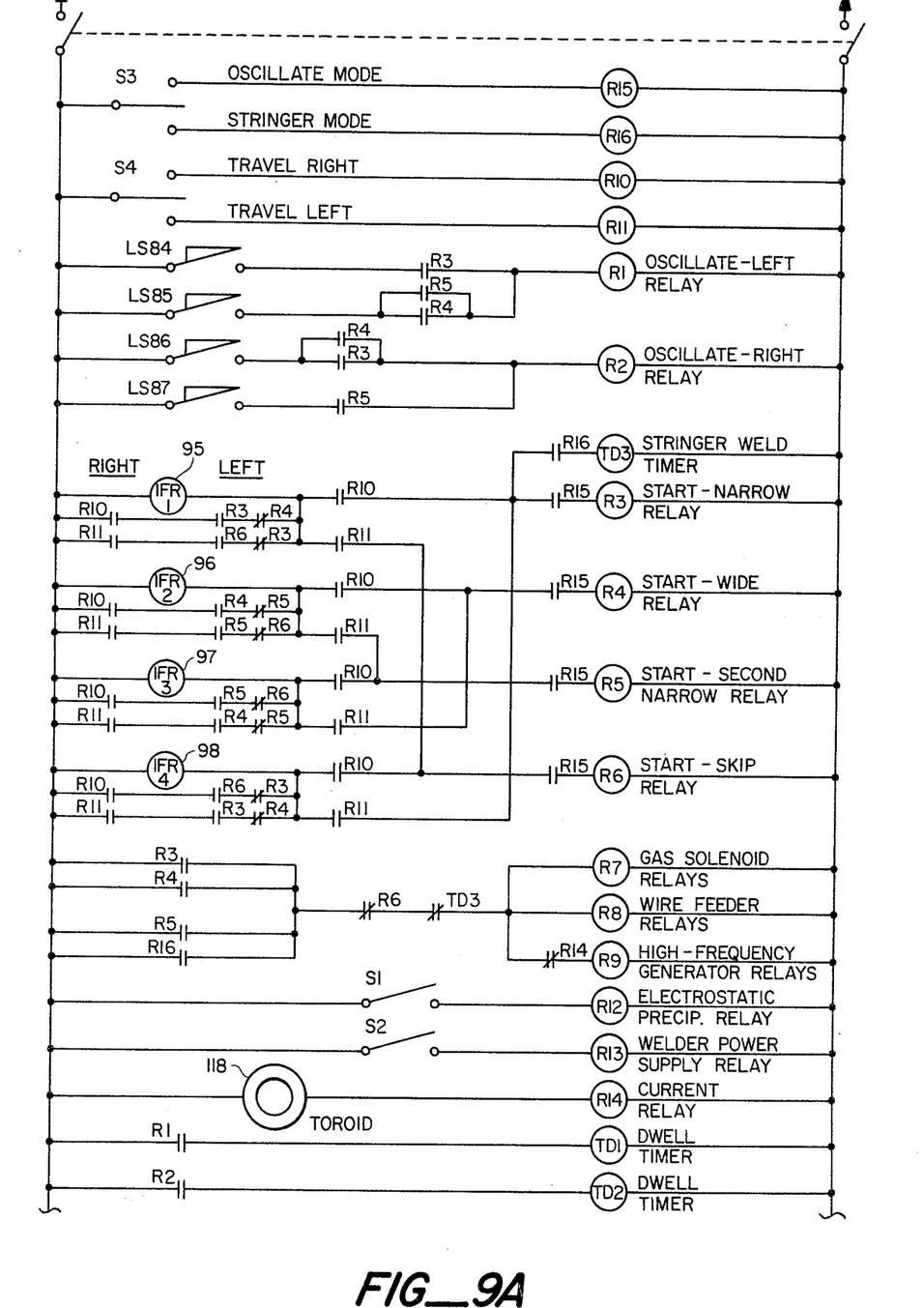
FIGS. 9A and 9B are an electrical schematic diagram of the track link resurfacing apparatus of FIG. 1.
Figure 9B:
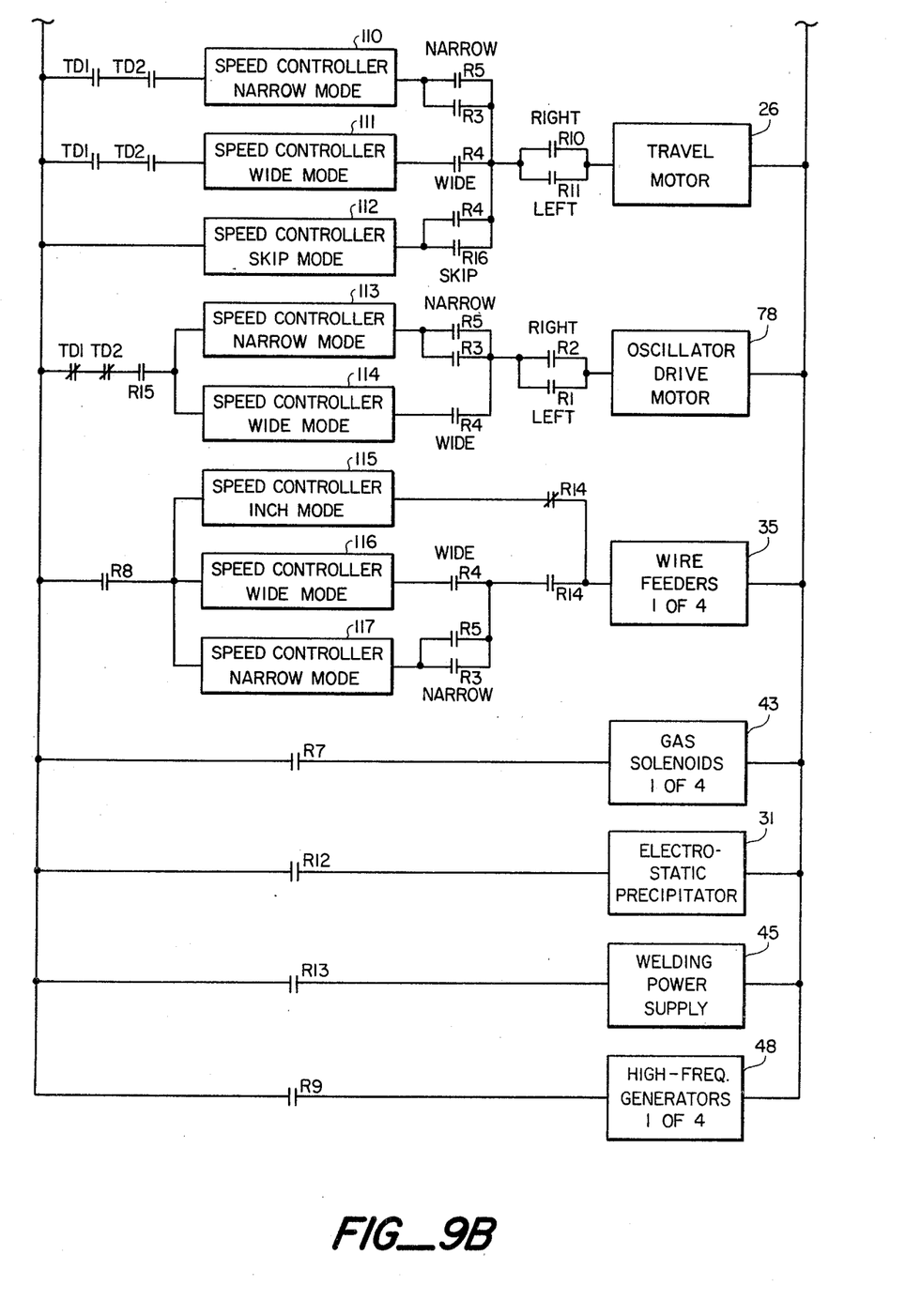

The sequence of operation of the apparatus is best described by referring to the electrical control schematic diagram FIGS. 9A and 9B. For the purpose of brevity the schematic diagram and the sequence of operation is only described with the car 22 traveling from left to right as illustrated in FIG. 1. It should be understood however that the car travels in both directions.

The apparatus is first energized by closing switch S 1 which energizes relay R 12 which energizes the electrostatic precipitator 31. Next switch S 2 is closed to energize relay R 13 which in turn energizes the welding power supply 45.

The apparatus operates in either the oscillation mode or the stringer mode. In the oscillate mode the welding heads move laterally back and forth across the surface of the track links as illustrated in FIG. 8. The welding heads lay oscillator beads. If the oscillate mode of operation is selected by the switch S 3, then relay R 15 is energized so that the oscillator drive motor 78 is energized. In the stringer mode of operation the welding heads do not move laterally with respect to the track links. The car 22 moves longitudinally along the track and a single stringer bead is longitudinally placed on each track link. If the stringer mode of operation is selected by switch S 3, then the oscillator drive motor 78 is not energized. The welding process runs continuously and is intermittantly stopped when the welding heads pass between the track links. The flags 102 are used to actuate the infrared sensor IFR 1. The welding process restarts when time delay relay TD 3 expires.

The car can move either to the left or to the right with respect to the water tank 17. The direction of movement is chosen by switch S 4 which either energizes relay R 10 or R 11. These relays control the direction of the DC travel motor 26 which drives the car. Relays 10 and 11 also switch the sequence of the infrared sensors IFR 1-4, 95-98 since in one direction IFR 1 is actuated first by the flag and in the other direction IFR 4, 98 is actuated first.

The car is moved initially by the travel motor 26 in the skip mode. This is a high speed mode of travel for moving the car quickly between the track links. The track motor is energized by a skip mode speed controller 112. When the first flag 102 corresponding to the first track link actuates the first infrared detector 95, relay R 3 is energized. Triggering relay IFR 1 means that the welding heads have commenced to pass over the leading edge 105 of the first track link. When relay R 3 is energized, the travel motor 26 is energized in the narrow mode by a narrow mode speed controller 110. Likewise the oscillator drive motor 78 is energized by a narrow mode speed controller 113 through the relay contact R 3 and either relay contact R 1 or R 2. Relay R 3 also connects the limit switches 86 and 84 into the control circuit. These limit switches alternately energize relays R 1 and R 2 to drive the oscillator drive motor back and forth. This motion generates the lateral motion of the welding heads across the surface of the track link.

When relay R 3 is energized, the welding process commences. Wire feeders 35 are energized and feed wire at the inch rate determined by the speed controller 115. Gas solenoid R 7 is also energized and commences sending the argon/carbon dioxide gas to the welding heads. At the same time the high frequency generators 48 are energized, superimposing a high frequency voltage on the welding wire. As the end of the welding wire approaches the grounded track link, a spark jumps from the end of the wire to the link establishing the arc. As soon as the arc is established, current flows through the toroid coil 118 energizing current relay R 14. At this point current relay control R 14 opens, de-energizing relay R 9 the high frequency generator relay and thereby de-energizing the high frequency generator. At the same time, relay contacts R 14 transfer control of the wire feeder speed control 35 from the inch speed to the welding speed for the narrow section. This speed is determined by speed controller S C 117.

The construction and operation of the toroid coil 118 is described in U.S. Pat. No. 3,024,353 entitled CURRENT CONTROLLABLE ALTERNATING CURRENT RELAY CIRCUIT issued on Mar. 6, 1962 to Brashear.

If the arc is ever broken, the toroid 118 de-energizes the relay R 14. If this occurs, the wire feeders 35 immediately stop, and the gas solenoids 43 immediately shut the gas valves.

The oscillator drive motor 78 drives the chain 76 from left to right as energized by the relays R 1 and R 2. Relays R 1 and R 2 also energize two dwell timers TD 1 and TD 2 which delay the starting of the oscillator drive motor. The purpose of these dwell timers is to stop the lateral motion of the welding heads at each end of their travel and at that point to permit the travel motor 26 to step the car in the longitudinal direction. This sequencing between the travel and oscillator motors causes the welding heads to travel along the square tooth path illustrated in FIG. 8.

When the flag 102 triggers the second infrared sensor IFR 2, 96, relay R 4 is generated. This means that the welding heads have commenced to pass over the leading edge 106 of the wide portion of the track link. When relay R 4 is energized, relay R 3 is de-energized and both the travel motor 26 and the oscillator drive motor 78 are energized by the speed controllers 111 and 114 in the wide mode of operation. Relay R 4 also changes the speed of the wire feeders 35 through the wide mode speed controllers 116 and limit switches 85 and 86 now actuate relays R 1 and R 2 to lengthen the lateral travel of welding heads across the wide portion of the track links.

When the flag 102 triggers the third infrared sensor IFR 3, 97, relay R 5 is energized. This means that the welding heads have commenced to pass over the trailing edge 107 of the wide portion of the track link and the second narrow mode of operation is commenced. Relay R 5 de-energizes relay R 4 and causes limit switches 85 and 87 to control the left and right motion of the oscillator drive motor 78 through relays R 1 and R 2. The relay R 5 energizes the travel motor 26, the oscillator drive motor 78 and the wire feeders 35 through the narrow mode speed controllers 110, 113, 117 to operate at the narrow mode speed.

When the flag 102 triggers the fourth infrared sensor IFR 4, 98, the start-skip relay R 6 is energized. This means that the welding heads have commenced to pass over the trailing edge 108 of the second narrow portion of the track link. Relay R 6 de-energizes relay R 7 and the gas solenoids 43 stop the flow of gas to the welding heads. Relay R 6 also stops the wire feeders 35 by de-energizing relay R 8. In addition, relay R 6 energizes the travel motor 26 in the skip mode through the speed controller 112 and the car moves forward until the next flag 102 triggers the first infrared sensor IFR 1, 95. Relay IFR 1 energizes relay R 3 which de-energizes relay R 6 and the above-described process is repeated for the next alternate track link.

The apparatus welds alternate links as illustrated in FIG. 8, because of the spacing and dimensioning of the flags 102 and the sensors 95-98. When the start-skip relay R 6 is first energized, the flag corresponding to the next track link down from the link just welded has already passed the first infrared sensor IFR 1, 95. Referring to FIG. 8, when flag 102 actuates sensor IFR 4, 98, the next flag 102' has passed sensor 95. Thus, the car and the welding heads move on to the next alternate link.

It should be understood that the travel motor 26, the oscillator drive motor 78 and the wire feeders 35 each have a narrow mode and a wide mode of operation. These motors are variable speed DC motors and each is driven at two different rates by the speed controllers 110, 111, 113, 114, 116 and 117. The speeds are changed so that the welding heads pass across and along each track link at a rate that will produce a uniform bead. The actual speeds are impirically determined.

As the car moves from one end of the water tank to the other, the welding heads are maintained in alignment with the guide channel 18. The guidance bar 19 is rigidly attached to the carriage which includes the horizontal support rods 67, the three vertical plates 69, 69', 70 the sprockets 77 and the oscillator drive motor 78. If the guide channel 18 is curved, the guidance bar and the entire carriage tracks with it. This tracking motion is superimposed upon the lateral oscillatory motion of the welding heads and the ball bushing castings 65. This motion is possible because the ball bushing castings and the welding heads are supported by the horizontal support rod 67 and are translated by the chain 76 which also moves with the carriage. The carriage and the welding heads are suspended from the car by the linear bushing blocks 72. These linear bushing blocks are stationary with respect to the car.

It should be appreciated that although the preferred embodiment has been described in connection with resurfacing sealed and lubricated track links, this apparatus can also be used to rebuild standard sealed tracks. These are the tracks which are not lubricated and which do not contain neoprene seals which can be damaged by heat. Further, it should be understood that this apparatus can also weld with both oscillator and stringer beads and the welding heads can be adjusted to place a stringer bead along the sides of each track link to rebuild the side wear.

Thus, although the best mode contemplated for carrying out the present invention has been herein shown and described, it will be apparent that modification and variation may be made without departing from what is regarded to be the subject matter of the invention.

What is claimed is:

1. Apparatus for resurfacing track links for crawler-type tractors, comprising:
    (a) a platform for supporting a track link;
    (b) an elongate guide member mounted on the platform for aligning the track link with respect to the platform;
    (c) a car mounted on the platform and maneuverable with respect to the platform;
    (d) welding means for resurfacing the track link including a welding head attached thereto and means for maneuvering the welding head; and
    (e) a carriage supporting the welding means mounted for relative movement on the car, said carriage engages the guide member and is moved by the guide member relative to the car so that the welding head is maintained in alignment with the guide member as the car moves relative to the platform.

2. An apparatus as in claim 1 including drive means mounted on the carriage for laterally moving the welding heads back and forth in a cyclical manner with respect to the platform and means connected to the cyclical moving means for indexing the welding head with respect to a track link while the cyclical moving means is in operation.

3. An apparatus as in claim 2 wherein the cyclical moving means includes a chain that is cyclically driven back and forth and wherein the indexing means is a worm gear and sprocket assembly that adjusts the position of the welding head with respect to the chain.

4. Apparatus for resurfacing selected sealed and lubricated track links of a track for crawler-type tractors, said links having pins, bushings and seals, comprising:
    (a) a platform for supporting a track link;
    (b) a car mounted on the platform and maneuverable with respect to the platform;
    (c) welding means mounted on the car for resurfacing track links including a welding head attached thereto, said car maneuvers the welding means with respect to the platform;

(d) means mounted on the car for maneuvering the welding head with respect to the car;

(e) logic means for commanding the welding means to resurface every other track link of the track in an alternating manner so that the seal is protected against heat damage while the track is being resurfaced; and (f) a tank mounted on the platform and underlying the car and welding head for immersing the pins and bushings of the track link in a heat conductive fluid, whereby said fluid transfers the heat produced from welding away from the links so that the seal is protected against heat damage while the track link is being resurfaced.

5. Apparatus for resurfacing track links in tracks for crawler-type tractors, said track links each having a longitudinal axis parallel with the longitudinal axis of the track, comprising:

(a) an elongated platform having a longitudinal axis for supporting a track link with the longitudinal axis of the track link aligned parallel with the longitudinal axis of the platform;

(b) a car mounted on the platform and maneuverable with respect to the platform, car motor means connected to the car for driving the car with respect to the platform whereby said car moves in a direction parallel to the longitudinal axis of the platform;

(c) welding means mounted on the car for resurfacing the track link including a welding head attached thereto, whereby said car maneuvers the welding means in a direction parallel to the longitudinal axis of the platform;

(d) welding head motor means mounted on the car and to the welding head for laterally moving the welding head while in operation in a direction perpendicular to the longitudinal axis of the platform so that the track link can be resurfaced with beads which extend across said track link; and (e) switch means connected to the car motor means and the welding head motor means for energizing said two motor means in an alternating manner so that the welding head can resurface the track link in a square tooth pattern.

6. Apparatus for resurfacing track links in tracks for crawler-type tractors, said track links each having a longitudinal axis parallel with the longitudinal axis of the track, comprising:

(a) an elongated platform having a longitudinal axis for supporting a track link with the longitudinal axis of the track link aligned in parallel with the longitudinal axis of the platform;

(b) a car mounted on the platform and maneuverable with respect to the platform, whereby said car moves in a direction parallel to the longitudinal axis of the platform;

(c) welding means mounted on the car for resurfacing the track links including a welding head attached thereto, whereby said car maneuvers the welding means in a direction parallel to the longitudinal axis of the platform;

(d) means mounted on the car for laterally moving the welding head while in operation in a direction perpendicular to the longitudinal axis of the platform so that the track link can be resurfaced with beads which extend across said track link;

(e) car motor drive means connected to the car for driving the car with respect to the platform;

(f) welding head motor means connected to the car and to the welding head lateral moving means for driving the welding head with respect to the car;

(g) wire feeder means connected to the welding means for feeding welding wire to the welding means for regulating the amperage of the welding means; and (h) means connected to the car motor means, the head motor means, and the wire feeder means for controlling the speed of said motor and feeder means so that when resurfacing the wide portion of the track link the welding head moves at a first speed longitudinally with respect to the platform and at a second speed laterally with respect to the platform and at a first amperage level and when resurfacing the two narrow portions of the track link the welding head moves at a third speed longitudinally with respect to the platform and at a fourth speed laterally with respect to the platform and at a second amperage level.

7. Apparatus for resurfacing sealed and lubricated track links for crawler-type tractors, said track links having pins, bushings and seals, comprising:

(a) a platform sufficiently large to accomodate two tracks;

(b) a car mounted on the platform and maneuverable with respect to the platform;

(c) welding means including a plurality of welding heads mounted on the car for resurfacing four track links in said two tracks simultaneously, said car maneuvers the welding means with respect to the platform;

(d) means mounted on the car for maneuvering the welding head with respect to the car to simultaneously position said plurality of welding heads with respect to the four track links, said welding head maneuvering means including telescoping rectangular tube assembly for vertically positioning the welding heads, isolating said heads from vibration, and for controlling the position of the welding wire; and (e) a tank mounted on the platform and underlying the car and welding head for immersing the pins and bushings of the track link in a heat conductive fluid, whereby said fluid transfers the heat produced from welding away from the links so that the seal is protected against heat damage while the track link is being resurfaced.

* * * * *